United States Patent [19]
Minisci

[11] Patent Number: 5,301,068
[45] Date of Patent: Apr. 5, 1994

[54] OSTO-MIRROR

[75] Inventor: Vincent L. Minisci, Holden, Mass.

[73] Assignee: Brenda E. Minisci, Hatfield, Mass.

[21] Appl. No.: 942,518

[22] Filed: Sep. 9, 1992

Related U.S. Application Data

[63] Continuation-in-part of Ser. No. 760,566, Sep. 16, 1991, abandoned.

[51] Int. Cl.$^5$ .............................................. G02B 7/18
[52] U.S. Cl. ........................... 359/879; 359/881; 248/472; 248/473; 248/474; 248/488
[58] Field of Search .............. 359/872, 879, 880, 881; 248/469, 472, 473, 474, 476, 479, 480, 488

[56] References Cited
U.S. PATENT DOCUMENTS

| | | | |
|---|---|---|---|
| D. 140,582 | 3/1945 | Winslow | 359/880 |
| 433,708 | 8/1890 | Wiederer | 248/472 |
| 2,334,610 | 11/1943 | Crawford | 359/879 |
| 3,411,842 | 11/1968 | Levy | 359/879 |

FOREIGN PATENT DOCUMENTS 14503 of 1912 United Kingdom ............... 248/472

*Primary Examiner*—Scott J. Sugarman
*Assistant Examiner*—R. D. Shafer
*Attorney, Agent, or Firm*—Charles R. Fay

[57] ABSTRACT

A mirror in aid of a user of an ostomy appliance by holding it between the users' legs whether the user is lying down, sitting, or reclining, and utilizing a post between the users legs, a base for the post, under the legs, and an extension on the post holding a mirror, all parts being detachable and capable of being carried in a kit, pocket or handbag.

1 Claim, 1 Drawing Sheet

OSTO-MIRROR

RELATED APPLICATIONS

This application is a continuation-in-part of application Ser. No. 07/760,566, filed Sep. 16, 1991, now abandoned.

BACKGROUND OF THE INVENTION

About 1,000,000 persons in the United States have to wear ostomy appliances which have to be changed every several days. This requires taking the appliance off the body, cleaning the area, and attach a new or clean appliance in its place. Many have to do this without help, and this mirror is to help the patient perform the task. Many persons have a physique that renders the operation rather tedious and time consuming and most would be greatly helped if they could view the area better. The inventor has been experiencing this problem.

SUMMARY OF THE DISCLOSURE

A small flat elongated base of any suitable material such as wood may be used for this base which is just long enough to fit under the patient's knees or just above the knees when sitting, reclining, or lying down. This base has a receptacle midway of its length. This receptacle may be merely a recess in the top side of the base. It is preferably round and detachably receives and holds a round post such as a dowel which extends up past the legs. At its upper end the post has a detachable connection to another like round post in side-by-side relation by means of a screw and wing-nut cross-wise of and through both posts, one in extension of the other. At the upper end of the second post there is a means to detachable connect a small i.e. four or five inch square unbreakable mirror, which can be of acrylic or the like.

The posts can be swiveled on the base, which is held under the legs, the two posts can be swiveled on a horizontal axis, for universal mirror positioning, and the device can be taken apart into four small parts and carried in a kit or brief case or other container. When in use the mirror can be easily set up and give the patient a view of areas otherwise not seen in the process of removing and replacing the ostomy appliance.

PREFERRED EMBODIMENT OF THE INVENTION

Figure 1:
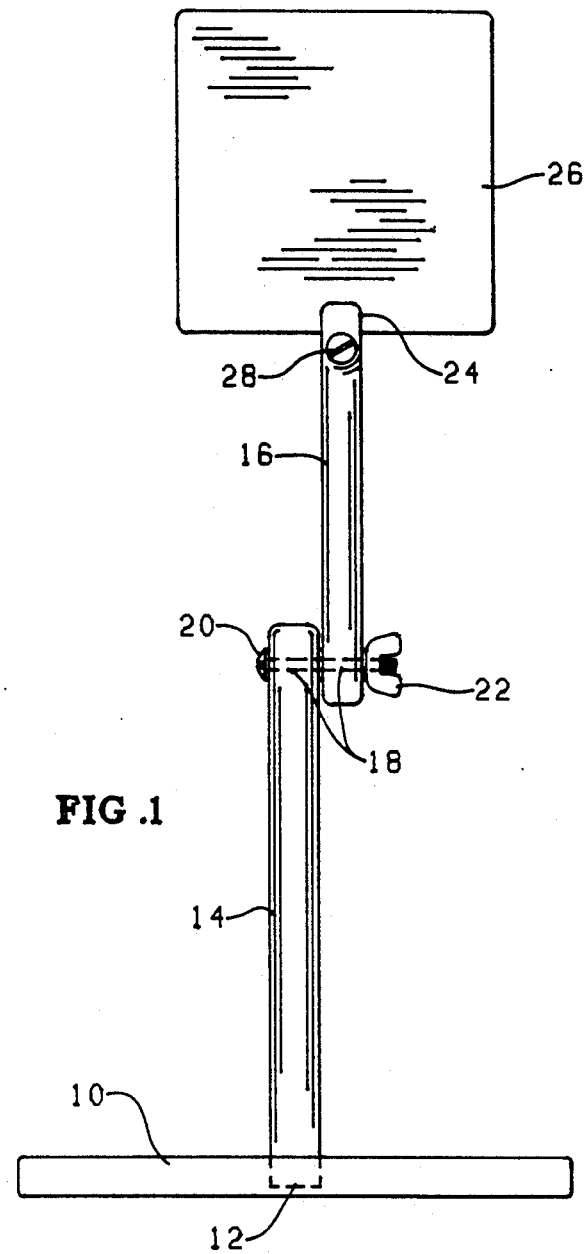
FIG. 1 is a front elevational view of the Osto-Mirror.
Figure 2:
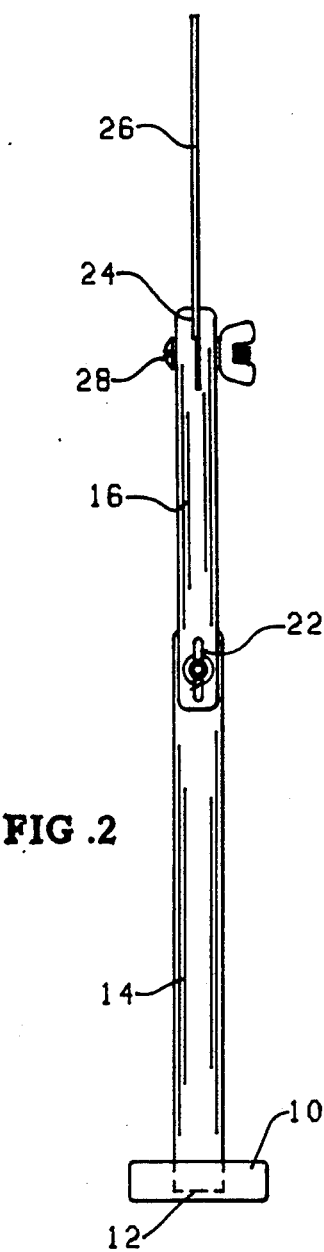
FIG. 2 is a side elevational view.
Figure 3:
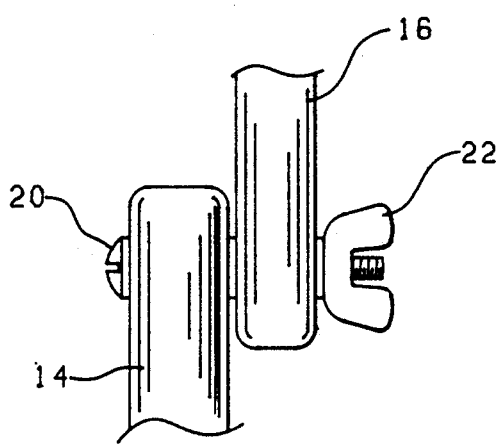
FIG. 3 is an enlargement of the joint between the post and the dowel.
Figure 4:
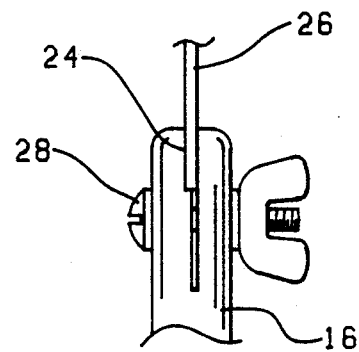
FIG. 4 is an enlargement of the mirror connection.

A flat base 10 which may conveniently be made of a lath-like piece of wood having a length e.g. about 7 or 8 inches is provided with a circular recess 12 at one side thereof. A round post 14 is hand set and removable with respect to the recess so that the post rises from one side of the base. Post 14 is frictionally held in the circular apperture in flat base 10 and the post 14 is rotatable in the circular apperture.

A dowel 16 is detachably secured in extension of the post 14 as by a pair of holes aligned through apertures at 18 that receive a bolt 20 having a nut 22, e.g. a wing-nut. The joint by which the dowel 16 and post 14 are secured together is a friction joint secured by the bolt 20 and wing nut 22 so that the angle the dowel 16 makes with the post 14 can be varied. At the opposite end, the dowel has an end open cross slot 24 to detachably receive a mirror 26, and means, e.g. a bolt 28, is provided to clamp or release the mirror. Mirror 26 having front and back surfaces, is frictionally held in the cross slot 24 for easy adjustment horizontally within the cross slot 24. The amount of force required to slide the mirror in the slot depends upon how tight the bolt 28 and nut attached thereto are tightened. The mirror is preferably unbreakable.

In use, the base 10 is placed under the legs of the user near the knees or at any desired location along legs with the base generally transverse of the legs and the mirror in position to be conveniently seen by the user to observe the connection of the bag to the body from a direction not otherwise possible.

When not in use, the parts are disassembled and placed in a small bag or kit and carried in pocket or purse, or other bag, very conveniently. If desired the dowel alone, or with the mirror, may be folded down over the post and not taken apart for transportation.

Also, when in use the user may change the dowel and mirror to the opposite side of the post, and also tilt the mirror.

It will be appreciated that the use of the subject device would be somewhat awkward except for the fact that the mirror can be adjusted in situ because it can be moved laterally and rotationally. In turn, this is because the mirror is held in it's slot by friction and the post on what it is mounted can be moved rotationally.

This, if incorrectly positioned under the thigh, it does not have to be removed from that position, adjusted rather blindly and repositioned.

I claim:

1. An aid for users of ostomy appliances in detaching and re-attaching the appliance to the body of said users, said aid comprising a flat elongated base (10), a circular hole midway between the ends of the base,
a cylindrical post (14) frictionally receivable in the hole for holding the post upright at a right angle to the base and rotationally adjustable,
an aperture through the post and adjacent the end of the post which is remote from the base, said aperture being diametric of the post and parallel to the base,
an aperture through a dowel at an adjacent end thereof and cooperating with the aperture in the post, a bolt extending through both apertures, a wing-nut on the bolt in position to secure the dowel to the post or selectively to release the post from the dowel and to provide that the dowel is attachable to the post at either of two opposite sides of the post in prolongation thereof,
means at the end of the dowel opposite its aperture to hold a mirror parallel to the base, and a mirror having front and back surfaces detachably held in said means,
the means holding the mirror comprising a slot, wherein the front and back surfaces of the mirror are positioned between the inner surfaces of said slot, and screw means to apply or relax pressure to the mirror so the mirror can be adjusted laterally in the slot.

* * * * *